United States Patent

[11] 3,587,859

| [72] | Inventors | Ronald F. Probstein<br>53 Jordan Road, Brookline, Mass. 02146;<br>Josef Shwartz, Cambridge, Mass. ((49<br>Einstein St., Haifa, Israel)) |
|---|---|---|
| [21] | Appl. No. | 748,811 |
| [22] | Filed | July 30, 1968 |
| [45] | Patented | June 28, 1971 |

[54] METHOD OF SEPARATING SOLID PARTICLES FROM A SLURRY WITH WASH COLUMN SEPARATORS
6 Claims, 5 Drawing Figs.

| [52] | U.S. Cl. | 210/66,<br>62/58, 210/71, 210/433 |
|---|---|---|
| [51] | Int. Cl. | B01d 37/04 |
| [50] | Field of Search | 62/58;<br>210/66, 71 |

[56] References Cited
UNITED STATES PATENTS

| 3,400,549 | 9/1968 | Karnofsky | 62/58 |
| 2,854,494 | 9/1958 | Thomas | 210/71X |
| 3,070,969 | 1/1963 | Ashley et al. | 62/58 |
| 3,202,283 | 8/1965 | Liu | 210/71 |

*Primary Examiner*—Samih N. Zaharna
*Attorney*—Roberts, Cushman & Grover

ABSTRACT: An apparatus and method for removing solid particles, such as ice crystals, from a mixture of said particles in a liquid medium, such as brine, wherein a wash column separator is used to form a porous bed of said particles and the liquid medium is caused to flow outwardly from the column at a screened opening positioned intermediate its ends. A wash liquid is introduced at one end of the column to displace the liquid medium from the interstices between the particles as the porous bed moves through the column. Control means are provided to control the relationship among the pressures at the ends of the porous bed and the pressure at such screened opening so as to maximize the rate at which the particles can be removed at the output end of the column.

INVENTORS:
RONALD F. PROBSTEIN
JOSEF SHWARTZ
BY THOMAS COOCH
MARTIN M. SANTA
ROBERT F. O'CONNELL
ATTORNEYS

METHOD OF SEPARATING SOLID PARTICLES FROM A SLURRY WITH WASH COLUMN SEPARATORS

This invention relates generally to apparatus and methods for removing solid particles from a mixture of said particles in a liquid medium and, more particularly, to apparatus and methods for removing ice crystals from a saline solution.

One method that has been used for removing substantially fresh, or salt-free, water from sea water, or other salt water solution, is a freeze-distillation process wherein a slurry of ice crystals mixed in a brine solution is produced by appropriately refrigerating salt water. The ice particles formed by freezing the salt water consist of substantially pure water while the salt accumulates in the unsolidified liquid phase or brine. Before the ice crystals can be melted to obtain pure water they are separated from the brine solution which adheres to the crystal surfaces because of interfacial tension. Since the ice crystals produced in the freeze-distillation process are relatively small, the total area of ice exposed to the brine is large and such surface tension forces assume major importance.

Conventional methods used up to now for the separation of ice crystals from a brine solution have proved to be too inefficient for use in converting sea water to fresh water. For example, attempts to overcome the difficulties associated with the separation of ice crystals from brine have involved the use of centrifuging, gravity drainage, vacuum filtration, and compression processes which have been found to be technically or economically unfeasible. One potentially effective separation method which has been used, however, involves a displacement process in which the brine is displaced from the interstices of the ice crystals by a second liquid, such as fresh water, which has a surface tension nearly equal to that of the brine. In a salt water conversion process the clean output product water can be utilized as the displacing liquid.

One particular continuously operated device based on the displacement principle has made use of a vertically oriented wash column separator in which a slurry of brine and ice crystals is introduced at or substantially near the bottom of such column. The ice crystals consolidate within the column so that a porous ice bed, or ice plug, which moves continuously upward is formed and a displacing liquid, or wash water, is added from above. In one particular embodiment used previously, the brine itself is utilized to provide the driving force for moving the ice particles upwardly in the column and one or more screened openings are located in the vertical side walls of the column at a position intermediate the upper and lower sections thereof through which screened openings the brine is discharged. The stream of brine thus carries the ice particles in an upward direction where they ultimately consolidate into a porous bed which moves continuously by means of a pressure difference maintained across the bed. As the porous ice bed moves upward through the wash water, the brine is displaced from the interstices of the porous bed and salt-free crystals are suitably harvested, or removed, at the top of the column and transferred to an appropriate melting apparatus.

However, such present day wash column structures are not normally employed under optimum operating conditions so that maximization of the production rate, either from a technical or from an economic viewpoint, has not been achieved. Moreover, production rates have been found to vary for apparently identical sets of operating conditions. Thus, the reliability of present day wash column separators has been relatively poor.

This invention on the other hand provides for a wash column separation system in which production rates at least an order of magnitude higher than those presently available for use may be reliably realized. In such system production rates are maximized by appropriately controlling the relationship among the pressures which exist at the bottom of the porous bed, at the top of the porous bed, and at the discharge screens. Thus, the pressure differentials between the top of the bed and the bottom of the bed, between the top of the bed and the discharge screen, and between the discharge screen and the bottom of the bed are subject to suitable controls so that an optimum formation of the porous bed, particularly in terms of its dimension below the discharge screened openings is maintained to produce a maximum production rate.

Apparatus used previously has never made use of such a three-way pressure control system and in fact has avoided the use of such pressure controls in the belief that such pressures are inherently fixed by the wash column structure and that their values cannot be changed so as to improve production rates. For example, prior to this invention, those in the art have believed that the distance from the bottom of the porous bed to the discharge screen is not at all subject to control and that such distance is unalterably fixed for a particular wash column configuration and dimension. This invention, on the other hand, shows that the pressure differential between the discharge screen and the bottom of the porous bed, for example, should be effectively controlled so as to minimize such distance and that such control substantially increases the efficiency of operation of the overall system.

The detailed structure and method of operation of the invention is described more clearly with reference to the attached drawings wherein:

FIG. 5 shows a portion of the wash column separator system of FIG. 1.

Figure 1:
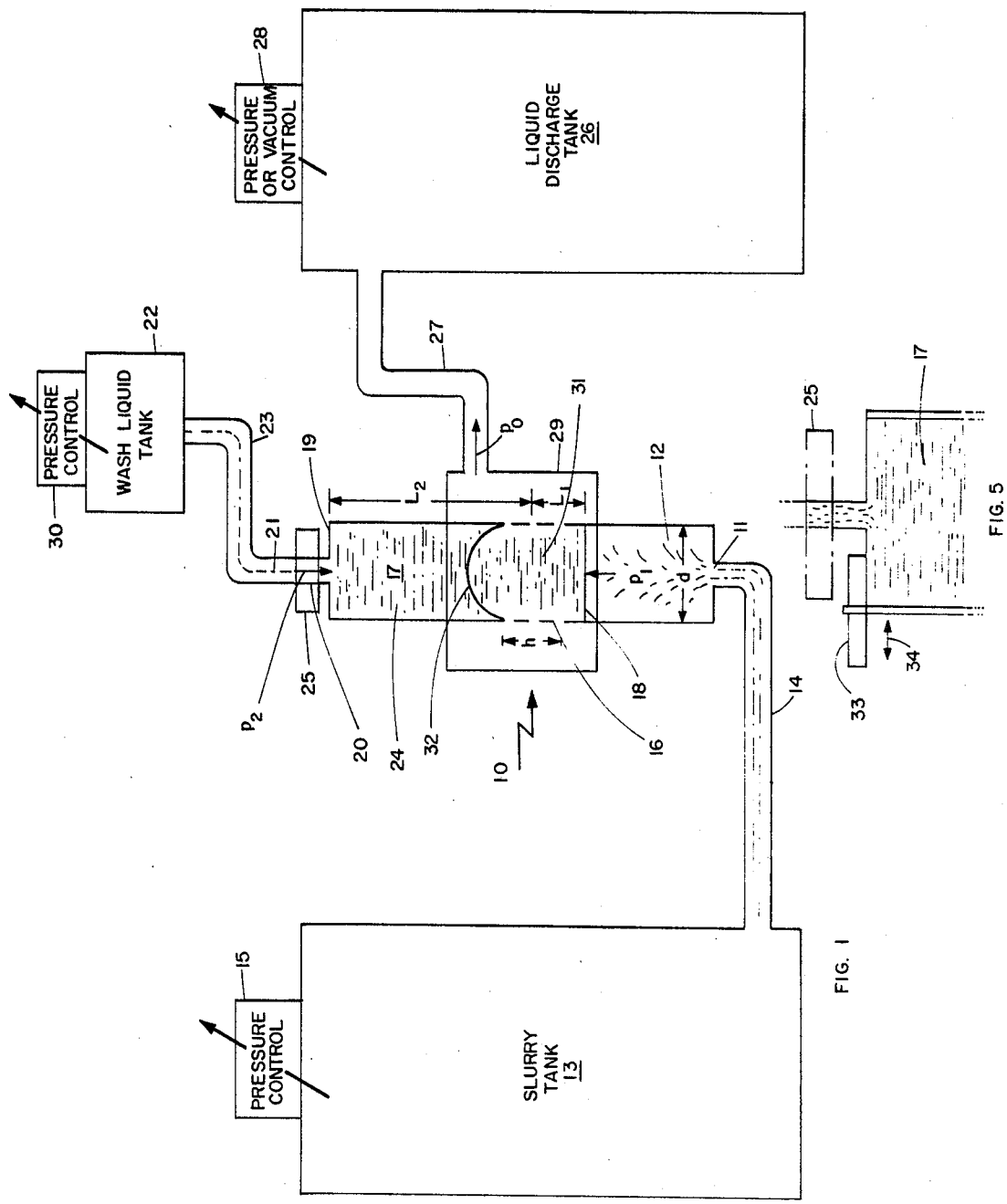
FIG. 1 shows a block diagram of a particular embodiment of a wash column separator system in accordance with the invention.

In FIG. 1 there is shown a wash column 10 having an input end 11 into which a slurry 12 comprising a plurality of solid particles, such as ice crystals, in a liquid medium, such as brine, is introduced. The slurry is obtained from an appropriate slurry tank 13 through suitable piping 14. A pressure control system 15 is utilized at the slurry tank to control the pressure of the slurry as it enters the input end 11 of column 10 and, hence, to control the pressure $p_1$ at the bottom of the porous bed which is subsequently formed within the column as discussed below. Column 10 may be of a cylindrical configuration having a screened discharge opening 16 located at a position intermediate its upper and lower end sections. In the cylindrical configuration, such screened opening is preferably in the form of a continuous screen about the entire periphery of the column. Alternatively, the column may have a different cross-sectional geometric configuration and, if rectangular, for example, preferably includes a pair of screens located in opposite walls of the column with the intervening walls maintained in solid form.

A porous bed 17 of ice crystals is thereby ultimately formed in the column 10 during the continuous operation of the column, such bed having a lower end surface 18 and an upper end surface 19 as shown. A suitable input pipe 20 is located at the upper end of column 10 for introducing a wash liquid 21, such as fresh water, from a wash liquid tank 22 through appropriate piping 23. The wash liquid thereupon forms a wash water layer 24 at the upper end of column 10 through which the upper end of porous bed 17 moves in its vertical travel upward. The wash water layer is separated from the brine containing region 31 by the interface 32. The pressure of the wash liquid and, hence, the pressure $p_2$ at the upper end of the porous bed 17 can be controlled by pressure control means 30. An appropriate removal means, such as a mechanical scraper 25 of appropriate known configuration not shown in detail, is also located at the upper end of column 10 and is used to remove continuously the upper portion of porous bed 17 as it moves upwardly. Such removed portion can be appropriately conveyed to a melter (not shown) by suitable conveying means (also not shown).

As the slurry moves upwardly, the liquid medium, or brine, in which the ice crystals are carried into the column, is conveyed outwardly through screened opening 16 to a liquid discharge tank 26, again via appropriate piping 27. The outward pressure $p_o$ at screened opening 16 is controlled by a suitable pressure or vacuum control system 28 operated in conjunction with liquid discharge tank 26. Consequently, the region of column 10 at the screened opening is enclosed in a suitably sealed enclosure 29.

In discussing the operation of the structure described with reference to FIG. 1, the following dimensional and operating parameters of interest are defined. The pressure parameters $p_1$, $p_2$, and $p_o$ are defined as the pressures at the bottom surface of porous bed 17, at the upper surface of porous bed 17, and at the screened opening 16, respectively, as shown in the drawing. The distance $L_1$ extends from the center of screened opening 16 to the bottom end 18 of porous bed 17, while the distance $L_2$ extends from the center of screened opening 16 to the upper end 19 of said bed, as shown also in the drawing. The distance $h$ represents the height of the screened opening 16, and $d$ represents the diameter (or width) of the column. Other factors, such as the permeability of the porous bed and the external restraining forces operating on the porous bed are discussed below as their pertinence becomes apparent in the description which follows.

In the operation of the wash column separator, the rate of removal of ice crystals from the top of the column by scraper means 25 is arranged under continuous operating conditions to equal the rate of arrival of ice crystals at the bottom of the porous bed so that the overall length of the porous bed remains substantially constant during operation. The description which follows of the operation of the column shown in FIG. 1 concerns the operating time period after the so-called "startup" period during which operating time period the ice crystals have consolidated into a porous bed which extends upward to the full length of the column above the screens (the distance $L_2$) and to a certain distance below the screens (the distance $L_1$). Under such conditions, the production rate of the column is continuous and uniform in time.

In such continuous operation the slurry 12 is continuously introduced at the bottom of the column at a constant rate and the liquid brine filters upwardly through the bottom section of porous bed 17 and diverges outwardly toward the screened openings 16. Wash water is supplied at the top of the porous bed and forms a layer 24 through which the porous bed moves so that any brine remaining within the interstices of the ice crystals is displaced by the wash water and is directed downwardly toward the screened opening 16. It is desirable in the operation of the device that the pressure differential $(p_2-p_o)$ be maintained at a value such that a minimum amount of wash water is dispersed or filtered below interface 32 and, hence, through the porous bed and out from the screened opening 16. Thus, the value of such pressure differential is arranged so that the volume of layer 24 remains substantially constant and whatever small amount of wash liquid is lost through such filtering action is replaced by a sufficient amount of liquid introduced from the wash liquid tank 22. The pressure differential $(p_1-p_2)$ is maintained at a sufficiently large value to provide the driving force required to move the porous bed 17 with its entrained fluids at essentially constant velocity.

A sharp increase in the production rate, that is, the rate at which ice particles can be removed from the upper portion of porous bed 17, occurs with a decrease in the length $L_1$ of porous ice bed 17 below the center of screened opening 16. Since large volumes of brine have to be discharged through the lower portion of the porous bed and, thence, through the screened opening 16, the portion of the porous bed below the screens presents a considerable resistance to the fluid flow, thus, severely limiting the rate of brine discharge, the rate of ice transport to the column, and the rise of ice in the column. A decrease in the length $L_1$ of porous bed 17 below the screened opening increases both the brine rate of flow and the porous bed upward velocity and, correspondingly, has been found to produce a remarkable increase in the production rate.

Since it is advantageous, therefore, to operate the column with as small a value for $L_1$ as is possible, it appears, at least theoretically, that an optimizing of the production rate may occur if $L_1$ is reduced to zero. However, there is a minimum practicable length which should be used since, if $L_1$ is reduced essentially to zero, the stream of mixed ice crystals and brine impinges directly on screened opening 16 and would tend to clog portions thereof and interfere with the continuous operation of the column. Therefore, it is preferable to operate the column so as to allow ice crystals to consolidate into a solid porous bed at some point just before reaching the screened opening which will avoid such interference with the continuous operation of the column. The location of this point (i.e. the distance $L_1$) can be controlled by controlling the relationship among the pressures $p_1$, $p_2$ and $p_o$.

If $L_1$ is fixed at a minimum practicable value, the production rate can also be further increased by increasing the length $L_2$ of the porous bed above the screened opening. An increase in $L_2$ requires a proportional reduction in the pressure $p_o$ at the screens to maintain the wash water velocity at a value approximately equal to zero. Reducing $p_o$ will increase the pressure difference $(p_1-p_o)$, and therefore also the rate of brine discharge and the production rate of the column.

Furthermore, if the friction force between the porous bed and the column walls is a significant factor in the total mechanical force which restrains the motion of the bed, an increase in $L_2$ requires a proportional increase in $p_1$ to keep the forces on the porous ice bed appropriately balanced so as to move the bed upwardly at a uniform rate under continuous operation. Thus, increasing the pressure $p_1$ will further increase the rate of brine discharge and, consequently, the production rate of the wash column separator. The production rate appears to increase indefinitely with an increasing $L_2$ and, hence, the limitation on the length of $L_2$ will in a practical sense be dictated primarily by the economic factors involved in the construction of a column having reasonable dimensions in view of the operating and construction costs desired.

Figure 2:
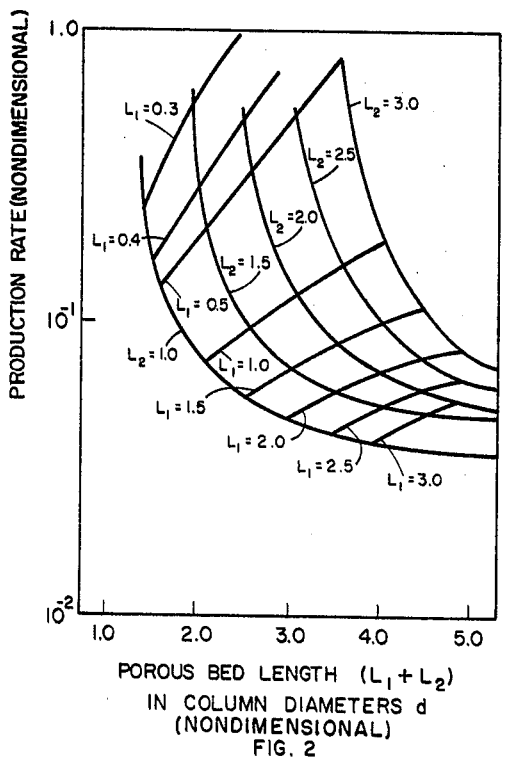
FIG. 2 shows a graph depicting the relationship between the production rate and the dimensions of the porous ice bed of the invention shown in FIG. 1.

The relationship of the production rate to the dimensions $L_1$ and $L_2$ is graphically illustrated in FIG. 2 wherein a decrease in $L_1$ for a fixed $L_2$, and an increase in $L_2$ for a fixed $L_1$, are shown to produce remarkable increases in production rate for particular fixed values of the overall length $(L_1+L_2)$ of porous bed 17. In accordance with standard engineering practice the production rates and porous bed lengths are plotted as nondimensional quantities as indicated therein.

Figure 3:
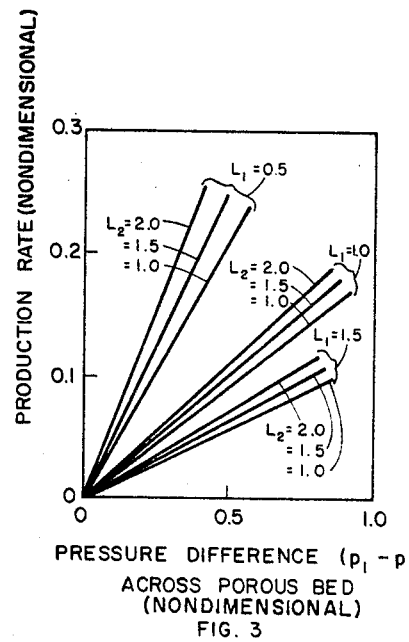
FIG. 3 shows a graph depicting the relationship between the production rate and the pressure across the porous bed for different dimensions of the bed in the invention of FIG. 1.

The production rate of such a wash column separator is also essentially linearly proportional to the pressure difference $(p_1-p_2)$ acting across the porous bed. For the continuous operation of the column the driving force on the porous bed 17, resulting from the pressure difference $(p_1-p_2)$, should be at least equal, however, to the mechanical restraining forces acting on the bed. Such forces which, of course, are always present in some form may arise, for example, from the friction between the ice bed and the wall of the column, from the downward force exerted on the porous bed by the mechanical scraper, or from any other external force which acts to restrain the movement of the ice bed, apart from those forces arising as a result of the specific controlled pressures $p_1$, $p_2$ and $p_o$ applied as previously discussed above. For particular values of $L_1$ and $L_2$, it has been found that such restraining force, and the corresponding pressure difference $(p_1-p_2)$, should be increased as much as possible in order to increase the rate of production of the column as shown graphically in FIG. 3. As in FIG. 2, the production rates and pressure differences are also plotted as nondimensional quantities.

While not absolutely necessary, it may be preferable to preset the total restraining force acting on the porous bed at a fixed value prior to operation of the column. This may be accomplished, for example, by utilizing an appropriate mechanical member such as a blade 33, shown in FIG. 5, mounted at the upper end of the column in contact with the upper portion of porous bed 17 to provide a suitable downward pressure at the top of the porous bed or by increasing the frictional force between the bed and the walls by roughening or otherwise treating the wall surfaces. Moreover, it may be further desirable in some applications to provide for control of the value of the restraining force acting on the porous bed during operation of the column. One such means for varying the restraining force may utilize blade 33, as mentioned above, which can be mounted so as to be capable of movement toward and away from the column in contact with porous bed 17. The restraining force so acting upon the porous bed, thus, may be varied as desired during operation by appropriately moving such blade either manually or by suitable and well-known mechanical control means (not shown), in the directions shown by arrow 34. Alternatively, the angle of the blade surface relative to the top surface of the porous bed may be varied either in conjunction with the movement of the blade toward and away from the porous bed or independently thereof so as to further vary such restraining force.

Figure 4:
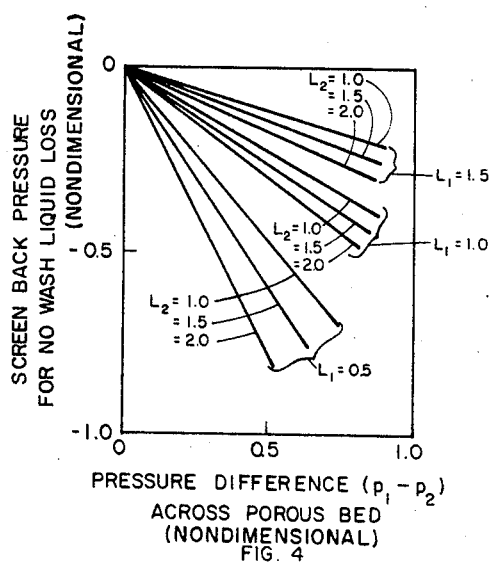
FIG. 4 shows a graph depicting the relationship between the back pressure at the screen required to maintain a nearly zero loss of wash liquid and the pressure difference across the porous bed for different dimensions of the bed in the invention of FIG. 1.

For every choice of the pressures $p_1$ and $p_2$ and the lengths $L_1$ and $L_2$ a particular setting of the back pressure behind the screen, $p_o$, is required so as to minimize the net downward flow, or loss, of the washing liquid, as depicted in FIG. 4. As in FIGS. 2 and 3, the pressures involved here are also plotted as nondimensional quantities.

The height $h$ of the screened opening 16 will have only a moderate effect on the production rate of the wash column separator. For very low values of $h$, the values of $p_o$ which are required to maintain a sufficiently high value of brine discharge rate at the screened opening may not be achievable in practice. It is recommended, therefore, to use a screen height $h$ which is an appreciable fraction, for example, at least approximately 20 percent, of the column diameter $d$.

In summary, a preferred structure and method of operation of the wash column separator, in accordance with the present invention, will include a porous bed with a short lower leg $L_1$ and a long upper leg $L_2$, a screen height which is an appreciable fraction of the column diameter, a pressure difference $(p_1-a_{J2})$ which is sufficient to drive the porous bed at a constant rate against its mechanical restraining forces and a suitable pressure setting $p_o$ behind the screen which will minimize the loss of wash liquid through the screen. The setting of all of the above mentioned parameters can be optimized so as to obtain the maximum production rate per unit cost of column material and operation.

Broadly stated, the overall wash column separator structure is constructed so that appropriate control means are provided to control the relationships among the pressures $p_1$, $p_2$ and $p_o$ to produce a maximum rate of removal of ice particles at the output end of the column.

While the structure has been described particularly as providing a means for removing ice particles from an ice crystal-brine mixture, it is clear that such structure can be utilized to separate any solid particles from a mixture of such particles in a liquid carrier. Variations in the structure and the method of operation thereof may occur to those skilled in the art without departing from the scope of this invention. Hence, the invention is not to be construed as limited to the particular embodiment as shown in the drawings and described above except as defined by the appended claims.

We claim:

1. A method for separating solid particles from a slurry containing said solid particles in a liquid medium comprising the steps of inserting said slurry into the input end section of a column;

causing said liquid medium to flow from said column at a position intermediate the input and output ends thereof thereby forming a porous bed of said particles subject to a restraining force within said column, said porous bed ends extending beyond said intermediate position;

introducing a wash liquid into said column to form a substantially constant layer thereof at the output end section of said column, said wash liquid thereby displacing said liquid medium from the interstices between said solid particles in said porous bed as said porous bed moves through said layer; and controlling the relationship among the pressures at the input and output ends of said porous bed and the pressure at said intermediate position so as to overcome said restraining force and to move said porous bed toward said output end of said column at a substantially constant velocity and so as to maintain the distance from the input end of said porous bed to said intermediate position at a preselected value such that said input end of said porous bed is at a point just below said intermediate position.

2. A method for separating solid particles from a slurry containing said solid particles in a liquid medium in accordance with claim 1 and further comprising the step of removing said solid particles as said porous bed moves to the output end of said column.

3. A method for separating solid particles from a slurry containing said solid particles in a liquid medium in accordance with claim 2 and further comprising the step of controlling the value of said restraining force acting on said porous bed during operation of said column.

4. A method of separating solid particles from a slurry containing said solid particles in a liquid medium in accordance with claim 1 wherein said preselected value of the distance from the input end of said porous bed to said intermediate position is made as small as possible without interfering with the flow of liquid at said intermediate position.

5. A method for separating solid particles from a slurry containing said solid particles in a liquid medium in accordance with claim 4 and further comprising the step of further controlling the relationship among said pressures so as to maintain the distance from said intermediate position to the output end of said porous bed at a preselected value.

6. A method for separating solid particles from a slurry containing said solid particles in a liquid medium in accordance with claim 1 wherein the relationship among said pressures is further controlled so as to adjust the loss of said wash liquid at said intermediate position.